(12) United States Patent
Chokshi

(10) Patent No.: US 8,996,980 B2
(45) Date of Patent: Mar. 31, 2015

(54) METHODS AND SYSTEMS OF AUTOMATED CLIENT-SERVER DATA VALIDATION

(75) Inventor: Sandip Chokshi, San Jose, CA (US)

(73) Assignee: Facebook, Inc., Menlo Park, CA (US)

(*) Notice: Subject to any disclaimer, the term of this patent is extended or adjusted under 35 U.S.C. 154(b) by 1143 days.

(21) Appl. No.: 12/110,192

(22) Filed: Apr. 25, 2008

(65) Prior Publication Data

US 2009/0319881 A1    Dec. 24, 2009

Related U.S. Application Data

(63) Continuation of application No. 10/203,016, filed as application No. PCT/US01/03050 on Jan. 30, 2001, now Pat. No. 7,366,977.

(60) Provisional application No. 60/180,440, filed on Feb. 4, 2000.

(51) Int. Cl.
    *G06F 17/00*      (2006.01)
    *G06T 11/00*      (2006.01)
    *G06F 17/24*      (2006.01)
    *G06T 5/50*      (2006.01)

(52) U.S. Cl.
    CPC ............ *G06T 11/001* (2013.01); *G06F 17/243* (2013.01); *G06T 5/50* (2013.01)
    USPC ....................................................... 715/222

(58) Field of Classification Search
    CPC .................................................... G06F 17/243
    USPC ....................................................... 715/222
    See application file for complete search history.

(56) References Cited

U.S. PATENT DOCUMENTS

| | | | |
|---|---|---|---|
| 5,572,643 | A | 11/1996 | Judson |
| 5,689,565 | A | 11/1997 | Spies et al. |
| 5,710,901 | A | 1/1998 | Stodghill et al. |
| 5,835,914 | A | 11/1998 | Brim |
| 5,907,680 | A | 5/1999 | Nielsen |
| 5,920,696 | A | 7/1999 | Brandt et al. |
| 5,956,709 | A | 9/1999 | Xue |
| 5,963,952 | A | 10/1999 | Smith |
| 5,995,975 | A | 11/1999 | Malcom |
| 5,999,948 | A | 12/1999 | Nelson et al. |
| 6,012,068 | A | 1/2000 | Boezeman et al. |
| 6,026,437 | A | 2/2000 | Muschett et al. |
| 6,076,080 | A | 6/2000 | Morscheck et al. |
| 6,141,793 | A | 10/2000 | Bryant et al. |
| 6,151,599 | A | 11/2000 | Shrader et al. |
| 6,167,523 | A | 12/2000 | Strong |
| 6,192,381 | B1 | 2/2001 | Stiegemeier et al. |

(Continued)

FOREIGN PATENT DOCUMENTS

JP      A 002172597      7/1990

OTHER PUBLICATIONS

Braband, et al., "PowerForms: Declarative Client-Side Form Field Validation", 2000, BRICS, Department of Computer Science, University of Aarhus, Denmark, p. 1-20.*

(Continued)

*Primary Examiner* — Amelia Tapp
(74) *Attorney, Agent, or Firm* — Keller Jolley Preece

(57) ABSTRACT

Methods and systems of automated data validation by client computer and by server computer based upon a form containing at least one form entry with at least one associated validation rule are presented.

20 Claims, 16 Drawing Sheets

(56) References Cited

U.S. PATENT DOCUMENTS

| | | | |
|---|---|---|---|
| 6,223,224 B1 | 4/2001 | Bodin | |
| 6,223,292 B1 | 4/2001 | Dean et al. | |
| 6,230,157 B1 | 5/2001 | Malcolm et al. | |
| 6,282,548 B1 | 8/2001 | Burner et al. | |
| 6,289,333 B1 | 9/2001 | Jawahar et al. | |
| 6,327,608 B1 | 12/2001 | Dillingham | |
| 6,336,137 B1 | 1/2002 | Lee et al. | |
| 6,340,977 B1 | 1/2002 | Lui et al. | |
| 6,345,278 B1 | 2/2002 | Hitchock et al. | |
| 6,353,839 B1 | 3/2002 | King et al. | |
| 6,353,923 B1 | 3/2002 | Bogle et al. | |
| 6,360,236 B1 | 3/2002 | Khan et al. | |
| 6,362,836 B1 | 3/2002 | Shaw et al. | |
| 6,370,573 B1 | 4/2002 | Bowman-Amuah | |
| 6,385,642 B1* | 5/2002 | Chlan et al. | 709/203 |
| 6,393,472 B1 | 5/2002 | Anerousis et al. | |
| 6,427,149 B1 | 7/2002 | Rodriguez et al. | |
| 6,519,627 B1 | 2/2003 | Dan et al. | |
| 6,535,883 B1 | 3/2003 | Lee et al. | |
| 6,615,253 B1 | 9/2003 | Bowman-Amuah | |
| 6,629,098 B2* | 9/2003 | Mc George, Jr. | 1/1 |
| 6,636,990 B1 | 10/2003 | Wadewitz | |
| 6,654,932 B1 | 11/2003 | Bahrs et al. | |
| 6,687,737 B2 | 2/2004 | Landsman et al. | |
| 6,704,906 B1 | 3/2004 | Yanovich et al. | |
| 6,714,928 B1 | 3/2004 | Calow | |
| 6,744,447 B2 | 6/2004 | Estrada et al. | |
| 6,748,418 B1 | 6/2004 | Yoshida et al. | |
| 6,804,778 B1 | 10/2004 | Levi et al. | |
| 6,859,910 B2 | 2/2005 | Croy | |
| 6,880,123 B1 | 4/2005 | Landsman et al. | |
| 6,952,279 B1 | 10/2005 | Iida | |
| 6,961,750 B1 | 11/2005 | Burd et al. | |
| 6,961,905 B1 | 11/2005 | Cover et al. | |
| 6,990,653 B1 | 1/2006 | Burd et al. | |
| 7,130,885 B2 | 10/2006 | Chandra et al. | |
| 7,231,644 B2 | 6/2007 | Kieffer | |
| 7,366,977 B2 | 4/2008 | Chokshi | |
| 7,493,554 B2 | 2/2009 | Paila et al. | |
| 7,966,626 B2 | 6/2011 | Kieffer | |
| 2002/0120628 A1* | 8/2002 | Hitchcock et al. | 707/100 |
| 2003/0145124 A1* | 7/2003 | Guyan et al. | 709/318 |
| 2011/0213834 A1 | 9/2011 | Kieffer | |
| 2013/0067308 A1 | 3/2013 | Chokshi | |
| 2013/0067309 A1 | 3/2013 | Chokshi | |
| 2013/0174182 A1 | 7/2013 | Kieffer | |
| 2013/0174183 A1 | 7/2013 | Kieffer | |

OTHER PUBLICATIONS

Bott, et al., "Special Edition Using Microsoft Office 2000", copyright 2000 by Que Corporation, published May 7, 1999, Chapter 50, p. 1036-1088.*
Attoui, A., et al.; *A Specification and Validation Method to Improve Concurrent Systems Reliability Based on Object Messageing and Rewriting Logic*: Oct. 1995; Proceedings, Sixth International Symposium on Software Reliability Engineering, pp. 387-392.
Chan, Daniel K.C.; *Form Management in the Vicomte Workflow System*, IEEE 1999.
Dayao, et al.; *SuperForms: A Security-Enhanced Smart Electronic Form Management System*: 1990: Globecom '90, copyright 1990, IEEE pp. 1079-1083.
The Microsoft Computer Dictionary, Third Ed. Copyright 1997 Microsoft Corporation p. 456.
Brabrand et al. "PowerForms: Declarative Client-Side Form Field Validation," World Wide Web, vol. 3, No. 4, 2000, pp. 205-214, NL & Brabrand et al.: "PowerForms: Declarative Client-Side Form Field Validation," 2000, XP002172597 abstract, (Database Inspec Online!, The Institution of Electrical Engineers, Inspec No. 6889583).
International Search Report of PCT/US01/03050 in 4 pgs., Feb. 14, 2002.
International Preliminary Examination Report of PCT/US01/03050 in 3 pgs., Oct. 4, 2001.
International Preliminary Examination Report and Search Report for PCT Application Ser. No. PCT/US01/02962. Jun. 2007.
U.S. Appl. No. 10/203,043, Jul. 14, 2005, Office Action.
U.S. Appl. No. 10/203,043, Jan. 11, 2006, Office Action.
U.S. Appl. No. 10/203,043, May 25, 2006, Office Action.
U.S. Appl. No. 10/203,043, Feb. 2, 2007, Notice of Allowance.
U.S. Appl. No. 11/761,287, Aug. 30, 2010, Office Action.
U.S. Appl. No. 11/761,287, Feb. 16, 2011, Office Action.
U.S. Appl. No. 11/761,287, Feb. 22, 2011, Office of Allowance.
U.S. Appl. No. 13/104,290, Feb. 15, 2013, Office Action.
U.S. Appl. No. 13/104,290, Sep. 25, 2013, Office Action.
U.S. Appl. No. 13/104,290, Nov. 20, 2013, Notice of Allowance.
U.S. Appl. No. 10/203,016, Jun. 15, 2005, Office Action.
U.S. Appl. No. 10/203,016, Dec. 2, 2005, Office Action.
U.S. Appl. No. 10/203,016, Jun. 23, 2006, Office Action.
U.S. Appl. No. 10/203,016, Dec. 14, 2006, Office Action.
U.S. Appl. No. 10/203,016, May 18, 2007, Office Action.
U.S. Appl. No. 10/203,016, Dec. 14, 2007, Notice of Allowance.
"Client-Side JavaScript Guide," "Chapter 10 Handling Events," p. 1-8, copyright 1999, Netscape Comminications Corporation, retrieved from http://docs.oracle.com/cd/E19957-01/816-6409-10/evnt.thm last updated May 27, 1999.
Bott et al., "Special Edition Using Microsoft Office 2000," copyright 200 by Que Corporation, published May 7, 1999, Chapter 50, p. 1036-1088.
Byers et al. "Accessing multiple mirror sites in parallel: using Tornado codes to speed up downloads" Mar. 1999 IEEE, pp. 275-283.
INSPEC Abstract No. B2000-06-0120-033, C2000-06-7810C-047: Creating a multiple-choice self-marketing engine on the internet; T.W. Ng; International Journal of Engineering Education; Jul.-Aug. 2000, 1 page.
INSPEC Abstract No. C1999-03-6115-015: Building object-oriented web pages with SilverStream; M. Pfeifer; WEB Techniques; Feb. 1999, 1 page.
INSPEC Abstract No. C1999-03-6130-006: Generalized event handling in JavaScript; A. Hildyard; WEB Techniques; Feb. 1999, 1 page.
INSPEC Abstract No. C2000-02-7250N-012: A dynamic select component for JavaScript; S. Johnson; Dr. Dobb's Journal; Jan. 2000, 1 page.
INSPEC Abstract No. C2000-08-6140D-008: Decrypting JavaScript; K. Chambers; Application Development Advisor; Jul.-Aug. 2000, 1 page.
INSPEC Abstract No. C2000-09-7810-007: SurveyWiz and FactorWiz: JavaScript web pages that make HTML forms for research on the Internet; M.H. Birnbaum; Behavior research Methods, Instruments, & Computers; May 2000, 1 page.
INSPEC Abstract No. C9604-6130D-001: Using JavaScript to create interactive Web pages; T. Tessier; Dr. Dobb's Journal; Mar. 1996, 1 page.
INSPEC Abstract No. C9710-6115-016: Using JavaScript to write JavaScript; N.R. Radovanovic; WEB Techniques; Sep. 1997, 1 page.
INSPEC Abstract No. C9801-6130B-047: Animation with layers in DHTML. Innovative examples from noted designers; J.S. Hamlin; WEB Techniques; Dec. 1997, 1 page.
INSPEC Abstract No. C9801-6130D-015: Jump starting your site Dynamic HTML. Active content without page updates; R. Dobson; WEB Techniques; Dec. 1997, 1 page.
INSPEC Abstract No. C9801-6150N-105: Responsive interaction for a large Web application: the Meteor Shower architecture in the WebWriter II editor; A. Crespo, Bay-Wei Chang, and E.A. Bier; Computer Networks and ISDN Systems; Sep. 1997, 1 page.
INSPEC Abstract No. C9804-6180-014: Orthogonal extensions to the WWW user interface using client-side technologies; A. Fox, S.D. Gribble, Y. Chawathe, A.S. Polite, A. Huang, B. Ling and E.A. Brewer; Proceedings of the ACM Symposium on user Interface Software and Technology. 10th Annual Symposium; Oct. 14-17, 1997, 1 page.
INSPEC Abstract No. C9806-6130G-023: Architecture, design, and development of an HTML/JavaScript Web-based group support system; N.0 Romano, Jr.; J.F. Nunamaker, Jr.; R.O. Briggs; and D.R. Vogel; Journal of the American Society for Information Science; May 15, 1998, 1 page.

(56) References Cited

OTHER PUBLICATIONS

INSPEC Abstract No. C9808-6140D-007: Adding style and behaviour to Web pages with a dash of Spice; D. Raggett; Computer Networks and ISDN Systems; Apr. 1998, 1 page.

Kong et al. "Mitigating server-side congestion in the Internet through pseudoserving" Aug. 1999 IEEE, pp. 530-544.

Moore, "User Input Validation in ASP.NET," Jul. 2000, MSDN, p. 1-9.

U.S. Appl. No. 13/104,290, filed Dec. 19, 2013, Notice of Allowance.
U.S. Appl. No. 13/620,858, filed Sep. 11, 2014, Office Action.
U.S. Appl. No. 13/620,613, filed Sep. 23, 2014, Office Action.
U.S. Appl. No. 13/620,850, filed Nov. 20, 2014, Office Action.

* cited by examiner

METHODS AND SYSTEMS OF AUTOMATED CLIENT-SERVER DATA VALIDATION

CROSS REFERENCE TO RELATED APPLICATION

This application is a continuation of U.S. patent application Ser. No. 10/203,016 (issued as U.S. Pat. No. 7,366,977), which is incorporated herein in its entirety by reference thereto and which is the U.S. National Phase under 35 U.S.C. §371 of International Application No. PCT/US01/03050, filed Jan. 30, 2001 (published as WO 01/57720), which claims priority to U.S. Provisional No. 60/180,440, filed Feb. 4, 2000.

TECHNICAL FIELD

This invention relates to checking the validity of data entry in web-based systems.

BACKGROUND ART

In web-based systems involving data entry, there is a problem in checking the validity of the data. The prior art provides three choices, each having disadvantageous consequences:
1. Check the data only at the client. This lets you be responsive to the user (you can display helpful messages in a timely way), but leaves your system open to bad data from entities that bypass your client and speak directly to your server.
2. Check the data only at the server. This ensures that the server does not accept bad data, no matter what client is used to send it, but is harder to use because it may take a while to display messages to the user when data is incorrectly entered.
3. Check the data at the client and at the server. This is responsive to the user and is safe from bad data, but requires a lot of engineering work because the data validation code has to be maintained on two platforms.

SUMMARY OF THE INVENTION

The present invention provides a way to validate data entry at both the client and the server with minimal engineering effort.

The system allows engineers to specify data validation rules for a form on a server. The system provides a version of the rules with the form to the client computer. The system also executes the rules on the server for further validation. The system may translate the rules into JavaScript data structures, passed as the version to the client for client-side validation. Because engineers only specify the rules for the form once, there is no possibility of the rules becoming out of sync between the form on the client and on the server.

A set of validation rules can be specified for each form (web page where data entry is allowed). Each rule is associated with a form element (e.g. the users email address or a phone number) and defines what is allowed and what is required for that form element.

Each rule can be created from a set of reusable, configurable constraints.

There is a set of pre-written constraints. New constraints can be added. Currently there are number constraints and string constraints.

Number constraints produce rules that force a field to be numeric and may also specify minimum and/or maximum values that the user must meet. String constraints produce rules that may have minimum or maximum lengths, may allow only certain characters, may require certain characters and may or may not allow white space (e.g. spaces, tabs).

Each supported constraint consists of server-side Java code and client-side JavaScript code.

When the server sends the form down to the browser it includes some JavaScript data structures, which are automatically generated from the set of rules that were defined for the form. When the user attempts to submit the form, some JavaScript code first iterates through each rule that was included in the automatically generated data structures. Each rule is checked against the appropriate entry field. If there is a violation of the rule, the JavaScript code immediately displays a message without involving the server. The generated data structure includes message text for each rule that can be displayed if the user violates a rule.

When the server receives a posted form, it iterates through each of the rules defined for that set. If there is a violation of the rule, the server responds to the client with an error message.

These and other advantages of the present invention will become apparent upon reading the following detailed descriptions and studying the various figures of the drawings.

DETAILED DESCRIPTION OF THE INVENTION

The present invention provides a way to validate data entry at both the client and the server with minimal engineering effort. The system allows engineers to specify data validation rules for each form or web page where data entry is allowed.

Figure 1:
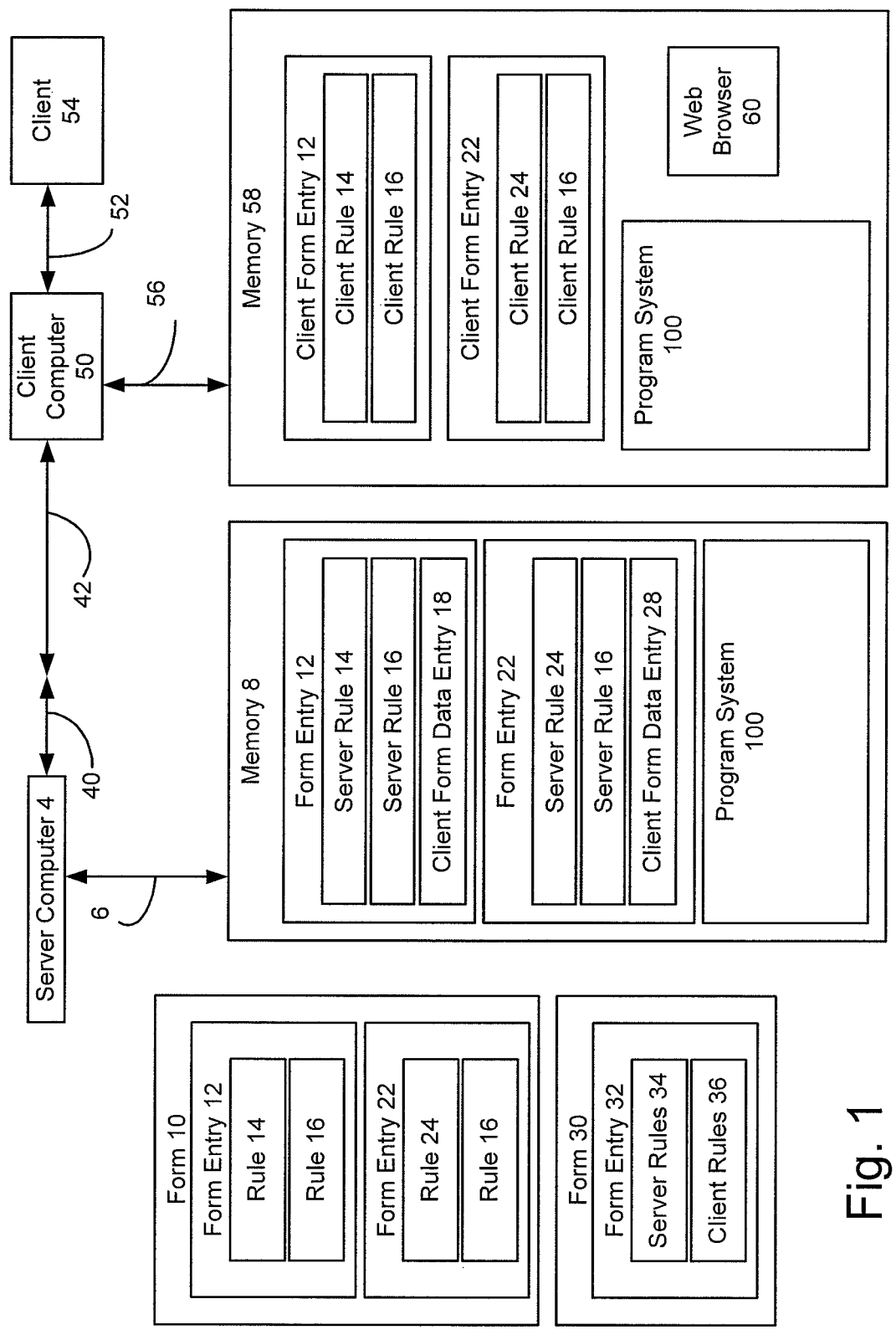
FIG. 1 depicts a system supporting server computer 4 communicatively coupled 40-42 to client computer 50 operated 52 by client 54, in accordance with certain embodiments of the invention.

FIG. 1 depicts a system supporting server computer 4 communicatively coupled 40-42 to client computer 50 operated 52 by client 54, in accordance with certain embodiments of the invention.

Server computer 4 is accessibly coupled 6 to memory 8 containing one form entry 12 associated with at least server rule 14 and at least one client rule 16 based upon form 10.

Form 10 may further comprise a second form entry 22 associated with at least one server rule 24 and at least one client rule 26.

There may be a second form 30 comprising at least one form entry 32 associated with at least server rule 34 and at least one client rule 36.

Memory 8 may further include program system 100 operating server computer 4 communicating 40-42 with client computer 50 to embody validation of data entry 52 by client 54 both by the client computer 50 using local client rules 66 and server computer 4 using server rules 44.

Memory 8 may include, but is not limited to, volatile memory and non-volatile memory. Memory 8 may include, but is not limited to, at least two memory components. The memory components may include volatile memory components and non-volatile memory components. At least one memory component may be organized as a file management system. The file management system, memory component may include, but is not limited to, at least one of the following: a semiconductor memory device, a disk drive and a disk array.

Server computer 4 communicatively couples 40-42 to client computer 50. Where arrows 40 and 42 meet may include, but is not limited to, a gateway, which may or may not possess redundant portals. Where arrows 40 and 42 meet may include, but is not limited to, a firewall. Where arrows 40 and 42 meet may include, but is not limited to, a web site.

As used herein, a computer will include, but is not limited to, instruction processors operating on one or more data streams concurrently and may execute one or more concurrent instruction streams. A computer will include, but is not limited to, inferential engines controlled by an inferential state. The inferential state may be changed by alterations in the active inferential rules, facts contained in a fact database and facts derived from interactions such as client data entry.

As used herein, the operational steps of the methods of this invention may be performed in finite state machines. The operational steps of the methods of this invention may be performed as program steps residing in memory accessibly coupled to a collection of one or more computers. Program steps may be interpreted or natively executed by the computers. Program steps may represent instructions in machine portable interpreted languages including, but not limited to various forms of one or more of the following: HTTP, XML, JAVA, Prolog, LISP, Scheme, C, C++, Smalltalk, FORTRAN and COBOL.

The program steps may implement machine language operations of a computer, interpreted instructions or inferential rules or facts carried out by at least one computer in the systems described herein.

Figure 2A:
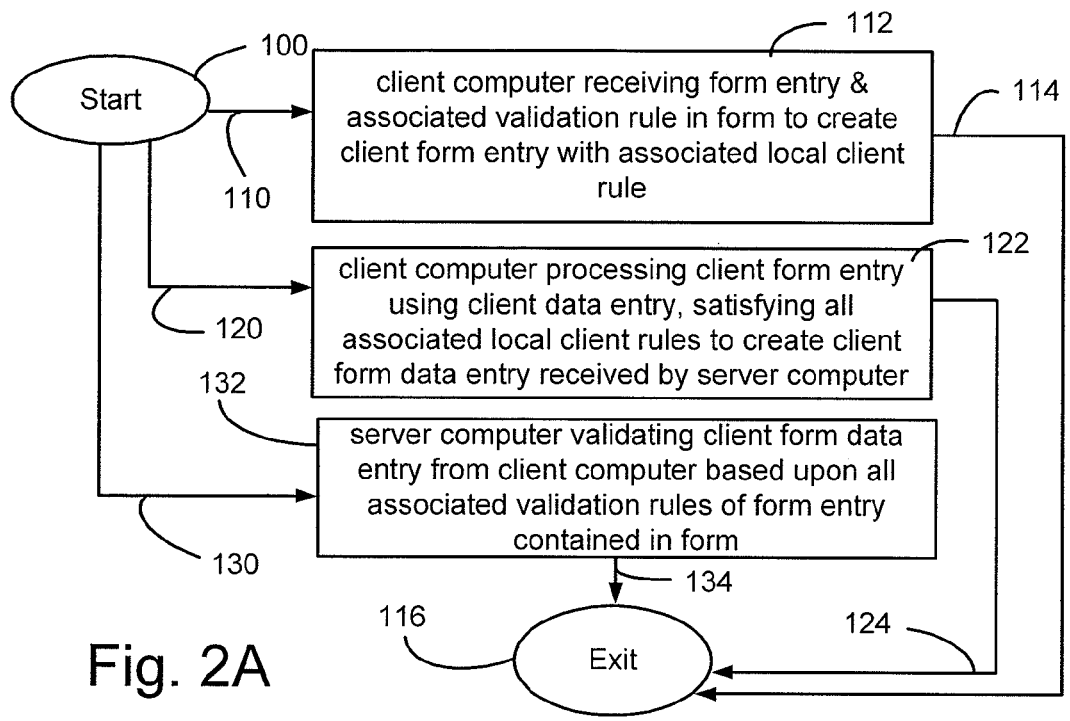
FIG. 2A depicts a detail flowchart of operation 100 of FIG. 1 further performing validating client 54 data entry 52 by a client computer 50 and by a server computer 40 based upon a form 10 containing at least one form entry 12 with at least one associated validation rule 14.

FIG. 2A depicts a detail flowchart of operation 100 of FIG. 1 further performing validating client 54 data entry 52 by a client computer 50 and by a server computer 40 based upon a form 10 containing at least one form entry 12 with at least one associated validation rule 14.

Arrow 110 directs the flow of execution from starting operation 100 to operation 112. Operation 112 performs the client computer receiving the form entry and at least one associated validation rule contained in the form to create the client form entry with at least one associated local client rule. Arrow 114 directs execution from operation 112 to operation 116. Operation 116 terminates the operations of this flowchart.

Arrow 120 directs the flow of execution from starting operation 100 to operation 122. Operation 122 performs the client computer processing the client form entry using the client data entry and satisfying all of the associated local client rules to create a client form data entry received by the server computer. Arrow 124 directs execution from operation 122 to operation 116. Operation 116 terminates the operations of this flowchart.

Arrow 130 directs the flow of execution from starting operation 100 to operation 132. Operation 132 performs the server computer validating the client form data entry received from the client computer based upon all of the associated validation rules of the form entry contained in the form. Arrow 134 directs execution from operation 132 to operation 116. Operation 116 terminates the operations of this flowchart.

Figure 2B:
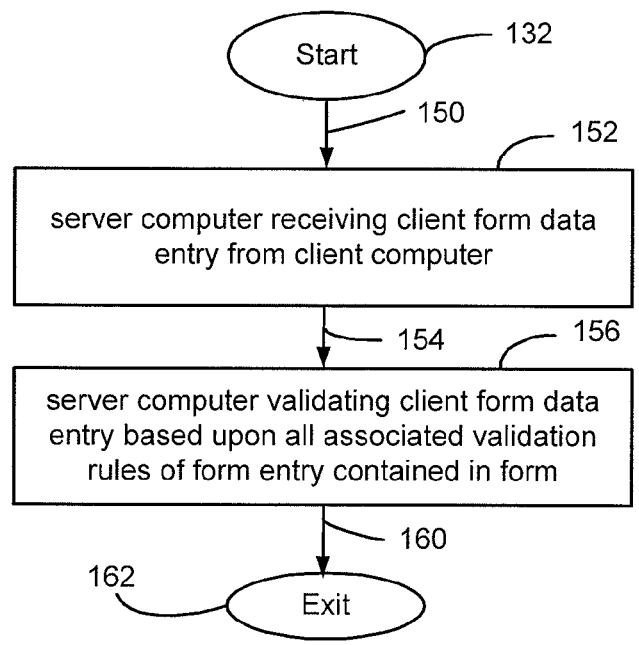
FIG. 2B depicts a detail flowchart of operation 132 of FIG. 2A further performing the server computer validating the client form data entry received from the client computer.

FIG. 2B depicts a detail flowchart of operation 132 of FIG. 2A further performing the server computer validating the client form data entry received from the client computer.

Arrow 150 directs the flow of execution from starting operation 132 to operation 152. Operation 152 performs the server computer receiving the client form data entry from the client computer. Arrow 154 directs execution from operation 152 to operation 156. Operation 156 performs the server computer validating the client form data entry based upon all of the associated validation rules of the form entry contained in the form. Arrow 158 directs execution from operation 156 to operation 160. Operation 160 terminates the operations of this flowchart.

Note that as used herein, the flowcharts of this document depict an illustrative manner by which to understand the operations of the various methods of certain embodiments of the invention.

In certain embodiments of the invention, concurrent object paradigms, often supporting real-time event-driven operating system may be supported. Such embodiments may further support message passing as a way to trigger events. As such, an arrow and the flow of execution represented by that arrow may serve to depict disparate actions in a variety of distinct objects, which taken in their entirety form an embodiment of the invention.

Note that operation 152 may be performed a different number of times than operation 156, in such embodiments of the invention utilizing real-time event-driven operating environments for concurrent objects supporting messaging, such as JAVA and C++.

In certain embodiments of the invention supporting inferential engines, these flowcharts portray the inferential action of the components of the inference system embodied.

Figure 3A:
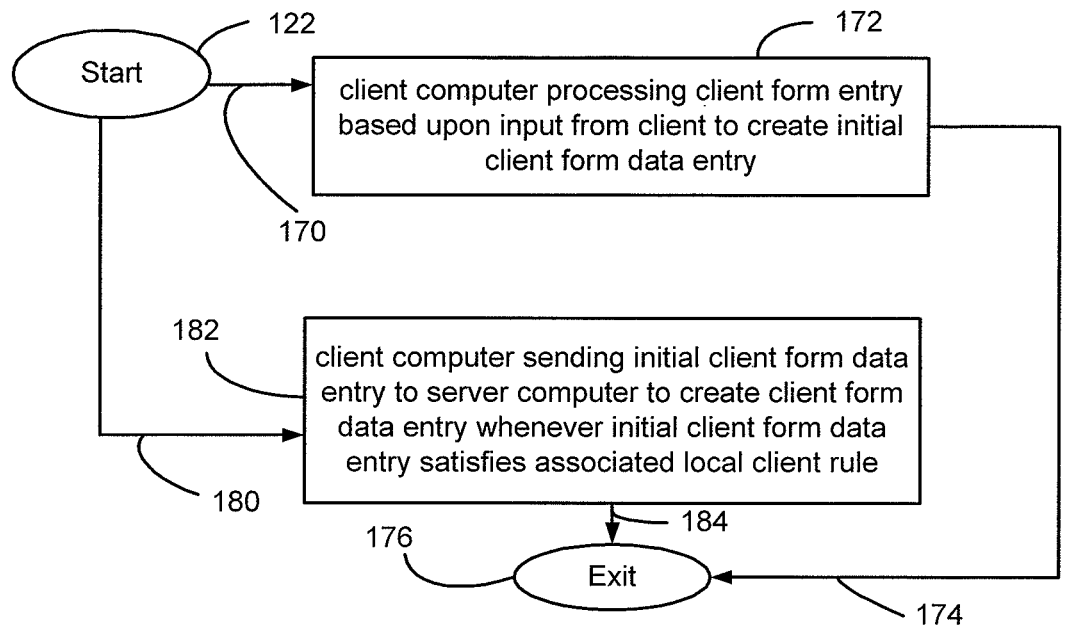
FIG. 3A depicts a detail flowchart of operation 122 of FIG. 2A further performing the client computer processing the client form entry.

FIG. 3A depicts a detail flowchart of operation 122 of FIG. 2A further performing the client computer processing the client form entry.

Arrow 170 directs the flow of execution from starting operation 122 to operation 172. Operation 172 performs the client computer processing the client form entry based upon input from the client to create an initial client form data entry. Arrow 174 directs execution from operation 172 to operation 176. Operation 176 terminates the operations of this flowchart.

Arrow 180 directs the flow of execution from starting operation 122 to operation 182. Operation 182 performs the client computer sending the initial client form data entry to the server computer to create the client form data entry whenever the initial client form data entry satisfies all of the associated local client rules. Arrow 184 directs execution from operation 182 to operation 176. Operation 176 terminates the operations of this flowchart.

Figure 3B:
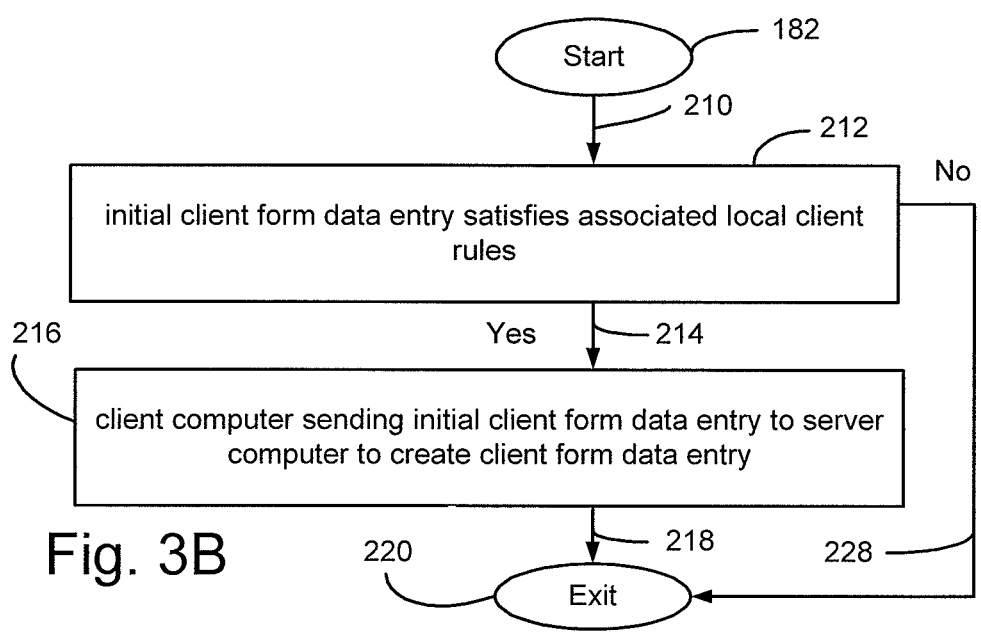
FIG. 3B depicts a detail flowchart of operation 182 of FIG. 3A further performing the client computer sending the initial client form data entry to the server computer.

FIG. 3B depicts a detail flowchart of operation 182 of FIG. 3A further performing the client computer sending the initial client form data entry to the server computer.

Arrow 210 directs the flow of execution from starting operation 182 to operation 212. Operation 212 determines when the initial client form data entry satisfies all of the associated local client rules. Arrow 214 directs execution from operation 212 to operation 216 when the determination is 'Yes'. Arrow 228 directs execution to 220 when the determination is 'No'.

Operation 216 performs the client computer sending the initial client form data entry to the server computer to create the client form data entry. Arrow 218 directs execution from operation 216 to operation 220. Operation 220 terminates the operations of this flowchart.

Figure 4A:
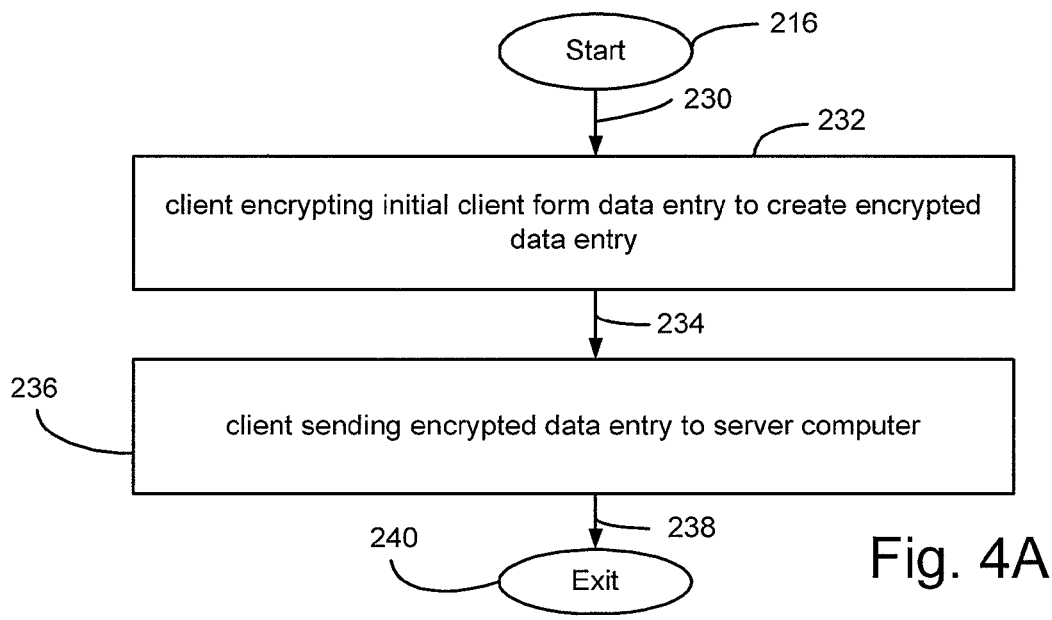
FIG. 4A depicts a detail flowchart of operation 216 of FIG. 2B further performing the client computer sending the initial client form data entry to the server computer.

FIG. 4A depicts a detail flowchart of operation 216 of FIG. 2B further performing the client computer sending the initial client form data entry to the server computer.

Arrow 230 directs the flow of execution from starting operation 216 to operation 232. Operation 232 performs the client encrypting the initial client form data entry to create an encrypted data entry. Arrow 234 directs execution from operation 232 to operation 236. Operation 236 performs the client sending the encrypted data entry to the server computer. Arrow 238 directs execution from operation 236 to operation 240. Operation 240 terminates the operations of this flowchart.

Figure 4B:
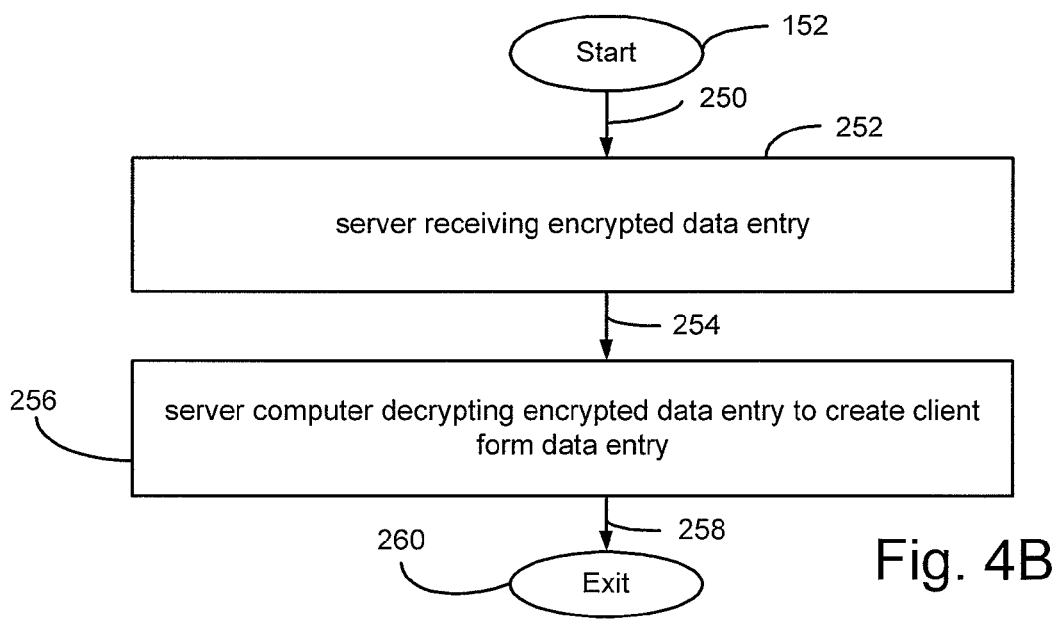
FIG. 4B depicts a detail flowchart of operation 152 of FIG. 2B further performing the server computer receiving the client form data entry from the client computer.

Is FIG. 4B depicts a detail flowchart of operation 152 of FIG. 2B further performing the server computer receiving the client form data entry from the client computer.

Arrow 250 directs the flow of execution from starting operation 152 to operation 252. Operation 252 performs the server receiving the encrypted data entry. Arrow 254 directs execution from operation 252 to operation 256. Operation 256 performs the server computer decrypting the encrypted data entry to create the client form data entry. Arrow 258 directs execution from operation 256 to operation 260. Operation 260 terminates the operations of this flowchart.

Figure 5:
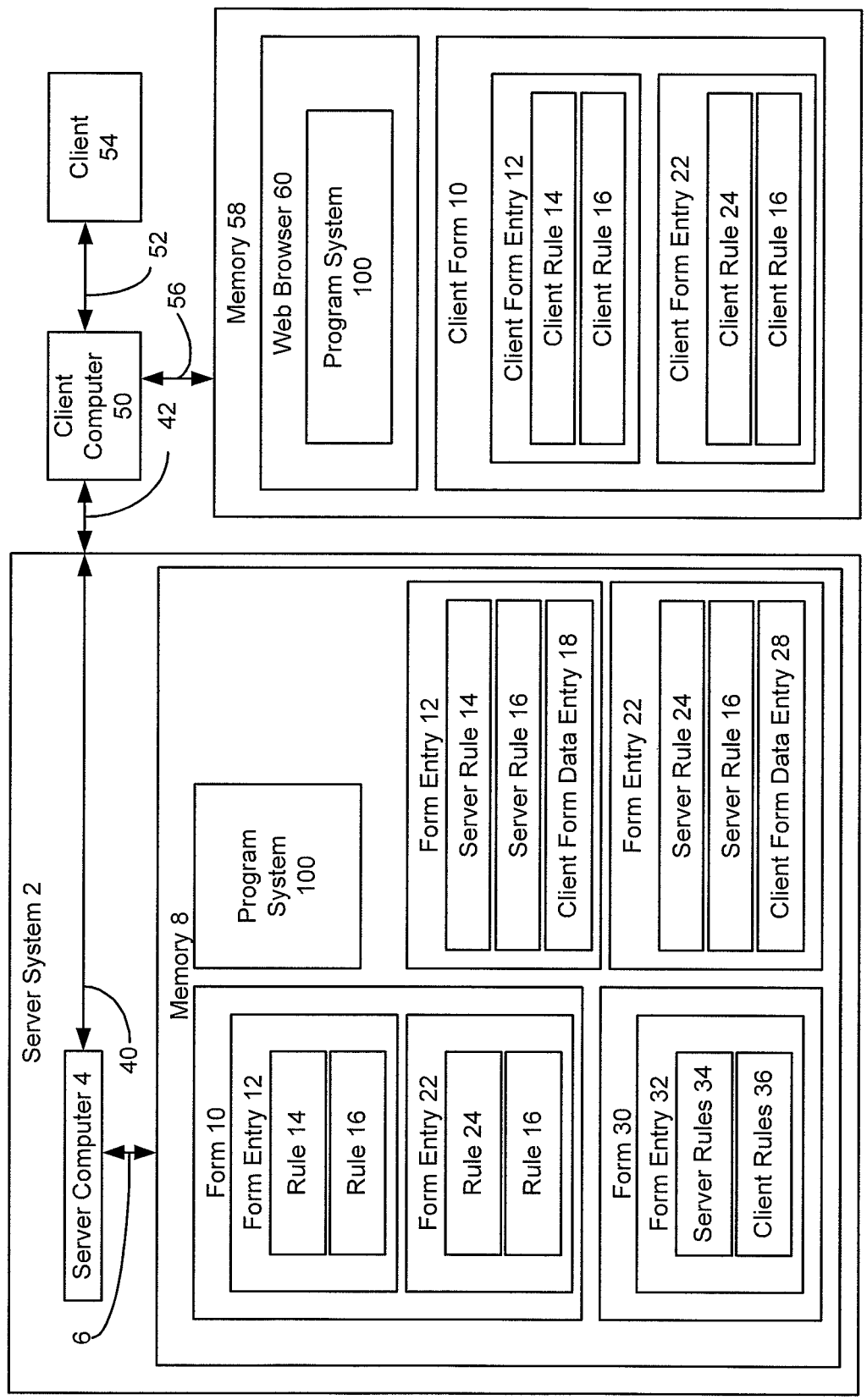
FIG. 5 depicts a server system 2 including server computer 4 of FIG. 1 communicating 40-42 with client computer 50 of FIG. 1.

FIG. 5 depicts a server system 2 including server computer 4 of FIG. 1 communicating 40-42 with client computer 50 of FIG. 1.

Memory 8 may contain form 10.

Memory 58 may include a web browser 60. Web browser 60 may further perform client operations supporting the program system 100. Note that in certain embodiments of the invention, the browser 60 may download a version of those client operations and form as a web page.

Memory 58 may include client form 10.

Note that rule 16 is associated with form entry 12 and form entry 22. An example of a rule which is associated with more than one form entry would be a rule which validates that birth date and age must be close to each other. A birth date entry indicating an age of 16 and an age entry of 21 should fail such a validation rule.

Figure 6:
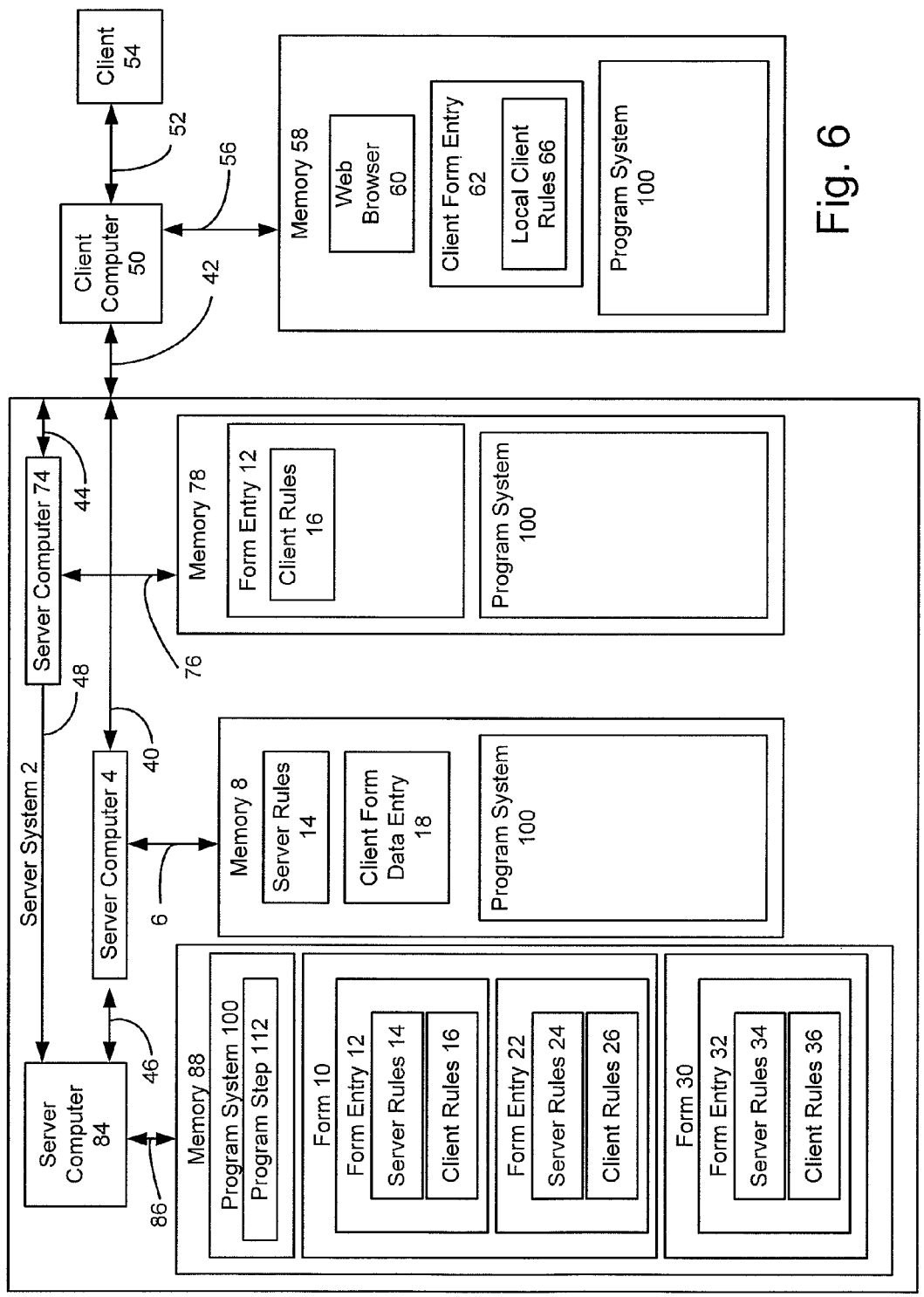
FIG. 6 depicts server system 2 of FIG. 5 further including server computer 74 communicating 44-42 with client computer 50 of FIG. 1 and including server computer 84 with accessibly coupled 86 memory 88 containing form 10.

FIG. 6 depicts server system 2 of FIG. 5 further including server computer 74 communicating 44-42 with client computer 50 of FIG. 1 and including server computer 84 with accessibly coupled 86 memory 88 containing form 10.

Server computer 74 may provide client computer 50 with client form entry 62 and associated local client rules 66.

Server computer 84 may provide server rules 14 to server computer 4. Server computer 84 may further provide form 10 to server computer 74. Server computer 84 may provide a version of form 10 to server computer 74. Server computer 84 may generate a version of form 10.

Server computer 74 may generate a version of form 10 to send to client computer 50.

Note that in certain embodiments, form 10 may include form entries 12 with pre-computed versions of the server rules 14 and client rules 16.

Figure 7A:
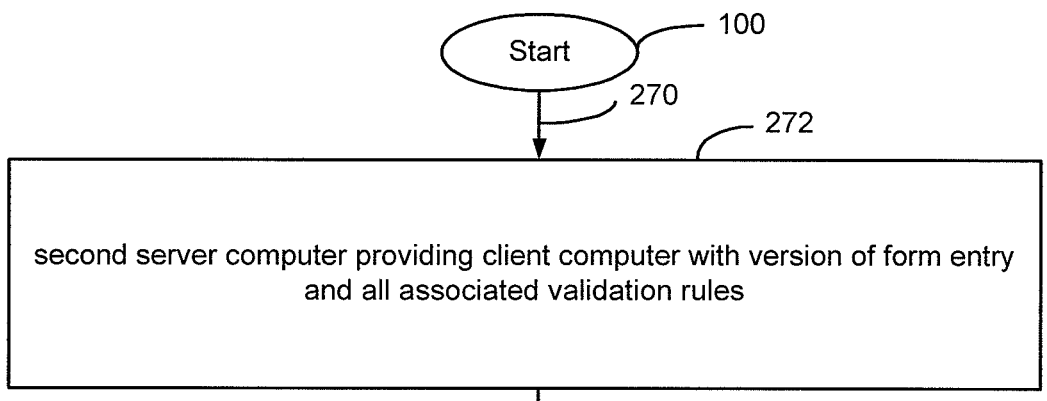
FIG. 7A depicts a detail flowchart of operation 100 of FIG. 2A further performing validating client data entry by the client computer and by the server computer.

FIG. 7A depicts a detail flowchart of operation 100 of FIG. 2A further performing validating client data entry by the client computer and by the server computer.

Arrow 270 directs the flow of execution from starting operation 100 to operation 272. Operation 272 performs a second server computer providing the client computer a version of the form entry and at least one associated validation rule. Arrow 274 directs execution from operation 272 to operation 276. Operation 276 terminates the operations of this flowchart.

Figure 7B:
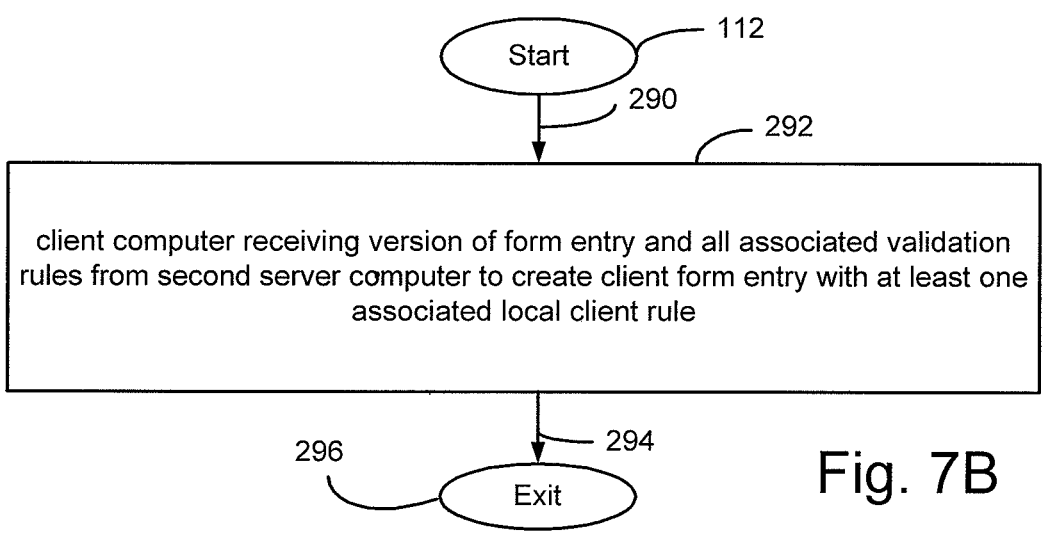
FIG. 7B depicts a detail flowchart of operation 112 of FIG. 2A further performing the client computer receiving the one form entry and at least one associated validation rule.

FIG. 7B depicts a detail flowchart of operation 112 of FIG. 2A further performing the client computer receiving the one form entry and at least one associated validation rule.

Arrow 290 directs the flow of execution from starting operation 112 to operation 292. Operation 292 performs the client computer receiving the one form entry and all of the associated validation rules from the second server computer to create the client form entry with at least one associated local client rule. Arrow 294 directs execution from operation 292 to operation 296. Operation 296 terminates the operations of this flowchart.

Figure 8A:
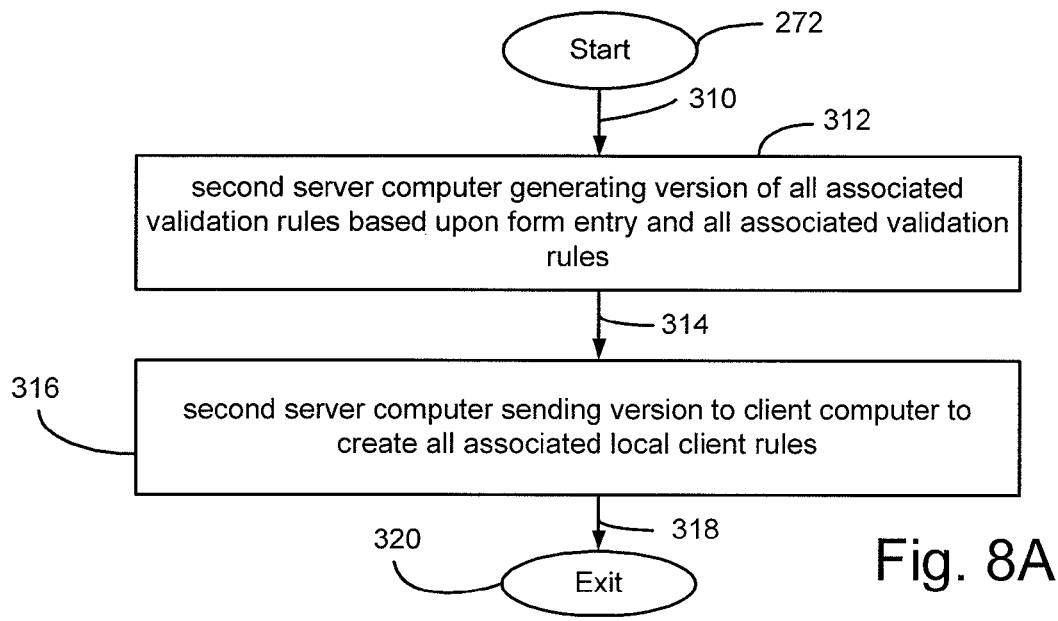
FIG. 8A depicts a detail flowchart of operation 272 of FIG. 7A further performing the second server computer providing the client computer the version of all the associated validation rules of the form entry.

FIG. 8A depicts a detail flowchart of operation 272 of FIG. 7A further performing the second server computer providing the client computer the version of all the associated validation rules of the form entry.

Arrow 310 directs the flow of execution from starting operation 272 to operation 312. Operation 312 performs the second server computer generating a version of all the associated validation rules based upon the one form entry and all of the associated validation rules. Arrow 314 directs execution from operation 312 to operation 316. Operation 316 performs the second server computer sending the version to the client computer to create all the associated local client rules. Arrow 318 directs execution from operation 316 to operation 320. Operation 320 terminates the operations of this flowchart.

Figure 8B:
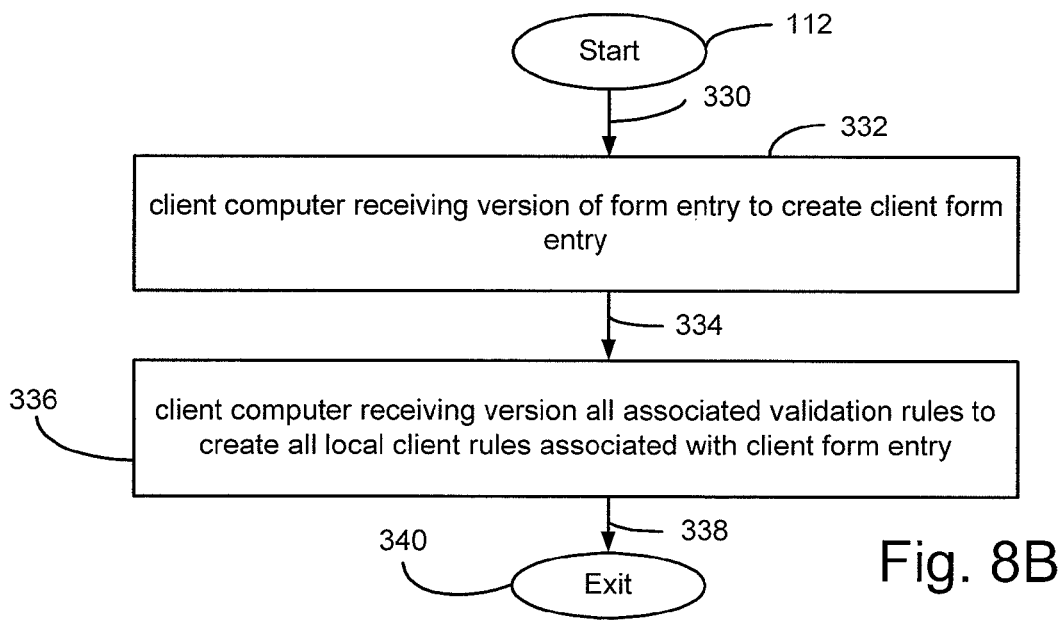
FIG. 8B depicts a detail flowchart of operation 112 of FIG. 2A further performing the client computer creating the client form entry with at least one associated local client rule.

FIG. 8B depicts a detail flowchart of operation 112 of FIG. 2A further performing the client computer creating the client form entry with at least one associated local client rule.

Arrow 330 directs the flow of execution from starting operation 112 to operation 332. Operation 332 performs the client computer receiving the one form entry to create the client form entry. Arrow 334 directs execution from operation 332 to operation 336. Operation 336 performs the client computer receiving the version of all the associated validation rules to create all the local client rules associated with the client form entry. Arrow 338 directs execution from operation 336 to operation 340. Operation 340 terminates the operations of this flowchart.

Note that in certain embodiments of the invention, a version of the form entry may be received as well.

Figure 9A:
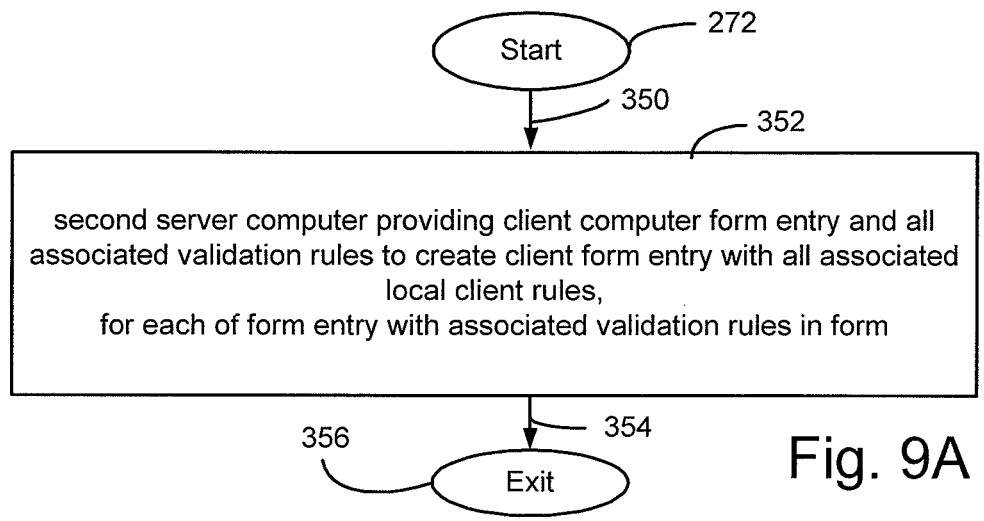
FIG. 9A depicts a detail flowchart of operation 272 of FIG. 7A further performing the second server computer providing the client computer the client form entry.

FIG. 9A depicts a detail flowchart of operation 272 of FIG. 7A further performing the second server computer providing the client computer the client form entry.

Arrow 350 directs the flow of execution from starting operation 272 to operation 352. Operation 352 performs the second server computer providing the client computer the form entry and all the associated validation rules to create the client form entry with all the associated local client rules, for each of the form entries with the associated validation rules contained in the form. Arrow 354 directs execution from operation 352 to operation 356. Operation 356 terminates the operations of this flowchart.

Figure 9B:
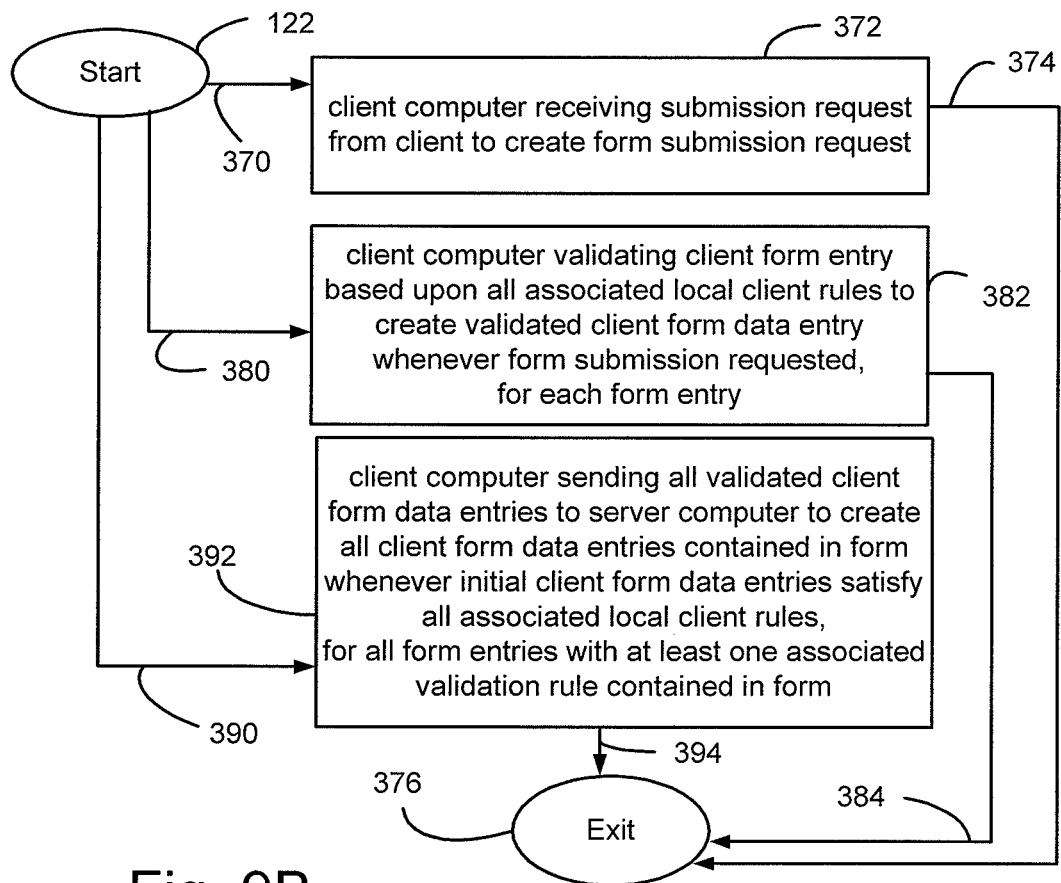
FIG. 9B depicts a detail flowchart of operation 122 of FIG. 2A further performing the client computer processing the client form entry.

FIG. 9B depicts a detail flowchart of operation 122 of FIG. 2A further performing the client computer processing the client form entry.

Arrow 370 directs the flow of execution from starting operation 122 to operation 372. Operation 372 performs the client computer receiving a submission request from the client to create a form submission request. Arrow 374 directs execution from operation 372 to operation 376. Operation 376 terminates the operations of this flowchart.

Arrow 380 directs the flow of execution from starting operation 122 to operation 382. Operation 382 performs the client computer validating the client form entry based upon all of the associated local client rules to create a validated client form data entry, whenever the client computer receives the form submission request, for each form entry with at least one associated validation rule contained in the form. Arrow 384 directs execution from operation 382 to operation 376. Operation 376 terminates the operations of this flowchart.

Arrow 390 directs the flow of execution from starting operation 122 to operation 392. Operation 392 performs the client computer sending all of the validated client form data entries to the server computer to create all of the client form data entries for the form whenever the initial client form data entries satisfy all of the associated local client rules, for all of the at least one form entry with at least one associated validation rule contained in the form. Arrow 394 directs execution from operation 392 to operation 376. Operation 376 terminates the operations of this flowchart.

Figure 10A:
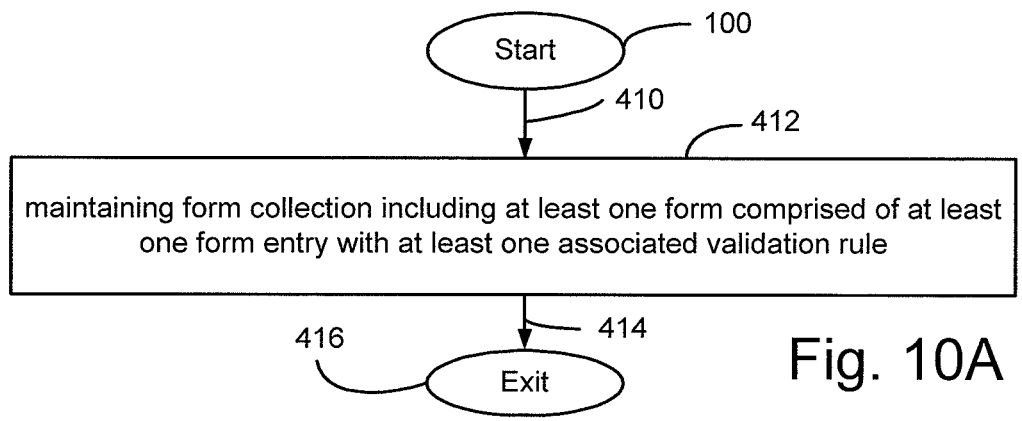
FIG. 10A depicts a detail flowchart of operation 100 of FIG. 2A further performing the method validating client data entry at both the client computer and the server computer.

FIG. 10A depicts a detail flowchart of operation 100 of FIG. 2A further performing the method validating client data entry at both the client computer and the server computer.

Arrow 410 directs the flow of execution from starting operation 100 to operation 412. Operation 412 performs maintaining a form collection including at least one form comprised of at least one form entry with at least one associated validation rule. Arrow 414 directs execution from operation 412 to operation 416. Operation 416 terminates the operations of this flowchart.

Figure 10B:
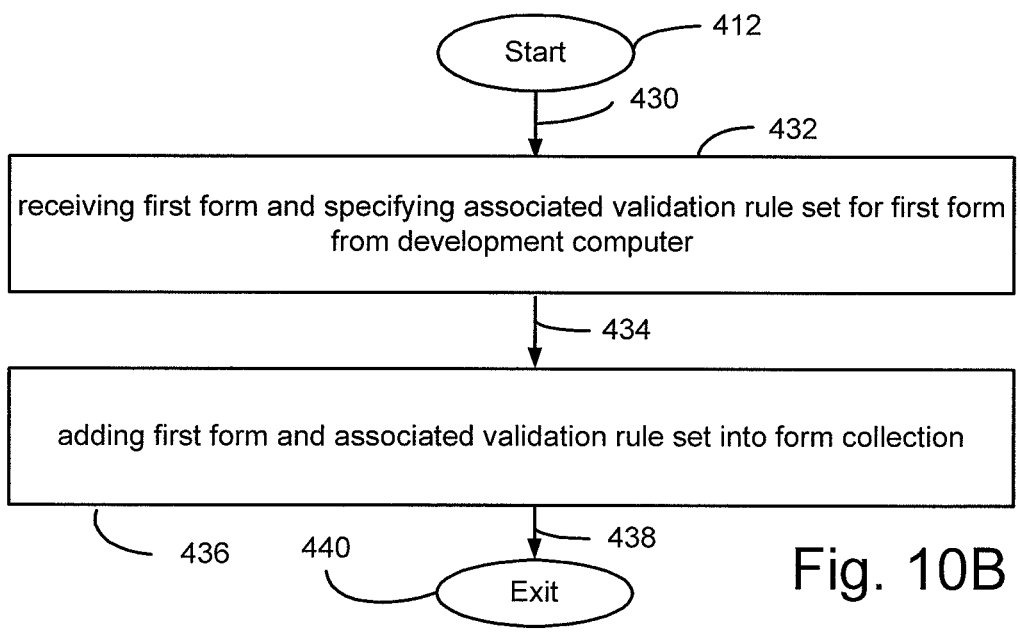
FIG. 10B depicts a detail flowchart of operation 412 of FIG. 10A further performing maintaining the form collection.

FIG. 10B depicts a detail flowchart of operation 412 of FIG. 10A further performing maintaining the form collection.

Arrow 430 directs the flow of execution from starting operation 412 to operation 432. Operation 432 performs receiving a first form and specifying an associated validation rule set for the first form from a development computer. Arrow 434 directs execution from operation 432 to operation 436. Operation 436 performs adding the first form and the associated validation rule set into the form collection. Arrow 438 directs execution from operation 436 to operation 440. Operation 440 terminates the operations of this flowchart.

Certain embodiments of the invention may include preparing a form containing at least one form entry with at least one associated validation, and sending that form to be added to a form collection.

Such operations may be performed as program steps residing in memory accessibly coupled to a development computer. The development computer may further be a server development computer or a client development computer. The server development computer may further belong to the server system containing the server computer. The server development computer may further be any of the following: the server computer 4 the second server computer 74 or the third server computer 84.

Sending the form to be added to the maintained form collection may further include sending the form as a message to a method of an object of a class maintaining a form collection available to server computer 4. The form collection may further be available to second server computer 74.

Figure 11A:
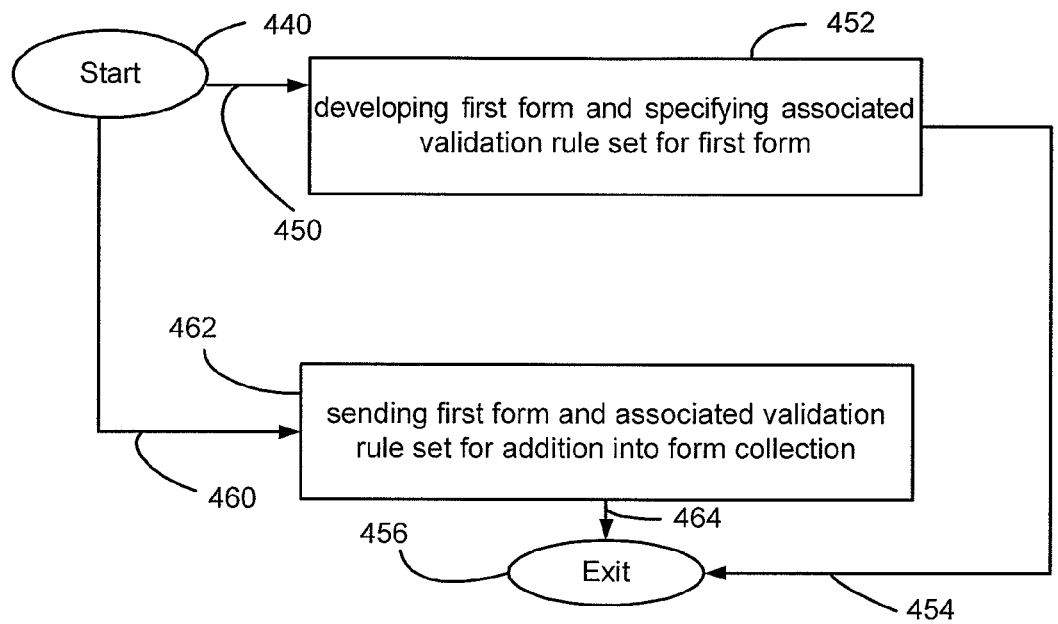
FIG. 11A depicts a flowchart of preparing and sending a first form containing at least one form entry with at least one associated validation rule for use in the methods using forms with both client validation and server validation of form entries with validation rules.

FIG. 11A depicts a flowchart of preparing and sending a first form containing at least one form entry with at least one associated validation rule for use in the methods using forms with both client validation and server validation of form entries with validation rules.

Arrow 450 directs the flow of execution from starting operation 100 to operation 452. Operation 452 performs developing the first form and specifying an associated validation rule set for the first form. Arrow 454 directs execution from operation 452 to operation 456. Operation 456 terminates the operations of this flowchart.

Arrow 460 directs the flow of execution from starting operation 100 to operation 462. Operation 462 performs sending the first form and the associated validation rule set for addition into the form collection. Arrow 464 directs execution from operation 462 to operation 456. Operation 456 terminates the operations of this flowchart.

Note that the associated validation rule set may be comprised of at least one associated validation rule.

Each of the associated validation rules may be associated with at least one form entry of the form collection.

Each rule may be created from a set of reusable, configurable constraints.

There may be a set of pre-written constraints. Currently there are number constraints and string constraints.

New constraints may be added.

Number constraints produce rules that force a field to be numeric and may also specify minimum and/or maximum values that the user must meet. String constraints produce rules that may have minimum or maximum lengths, may allow only certain characters, may require certain characters and may or may not allow white space (e.g. spaces, tabs).

Each supported constraint consists of server-side Java code and client-side JavaScript code.

The system may translate the rules of the form into JavaScript data structures, which are passed to the client for client-side validation of the form entries and the system also executes the rules on the server for further validation of the form entries. Because engineers only specify the rules once for the form, there is no possibility of the rules becoming out of sync between the form on the client and on the server.

Figure 11B:
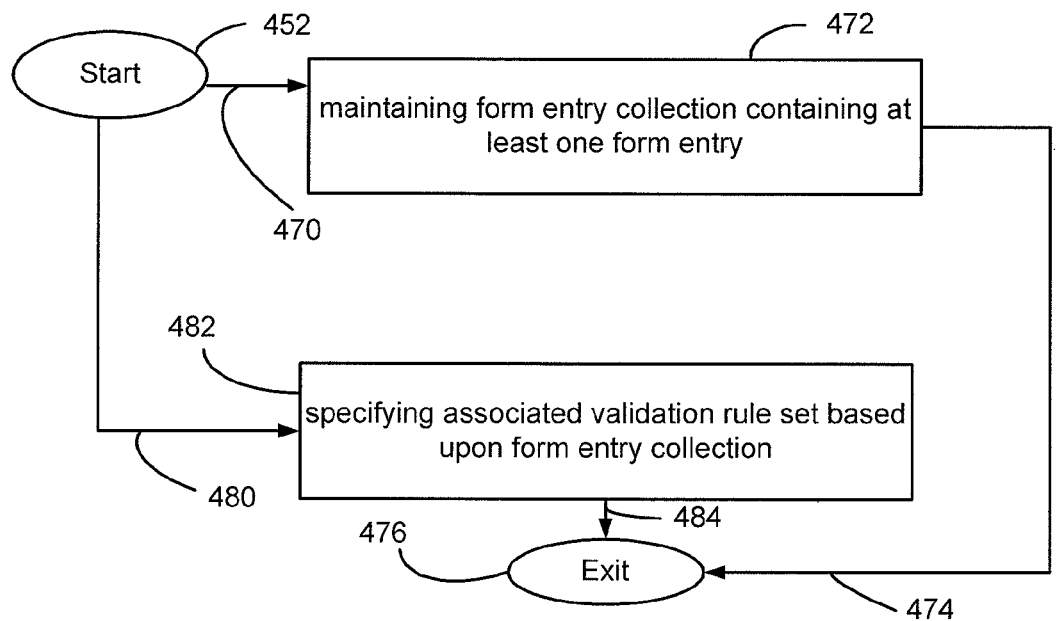
FIG. 11B depicts a detail flowchart of operation 452 of FIG. 11A further performing developing the first form and specifying the associated validation rule set for the first form.

FIG. 11B depicts a detail flowchart of operation 452 of FIG. 11A further performing developing the first form and specifying the associated validation rule set for the first form.

Arrow 470 directs the flow of execution from starting operation 452 to operation 472. Operation 472 performs maintaining a form entry collection containing at least one form entry. Arrow 474 directs execution from operation 472 to operation 476. Operation 476 terminates the operations of this flowchart.

Arrow 480 directs the flow of execution from starting operation 452 to operation 482. Operation 482 performs specifying the associated validation rule set based upon the form entry collection. Arrow 484 directs execution from operation 482 to operation 476. Operation 476 terminates the operations of this flowchart.

Figure 12A:
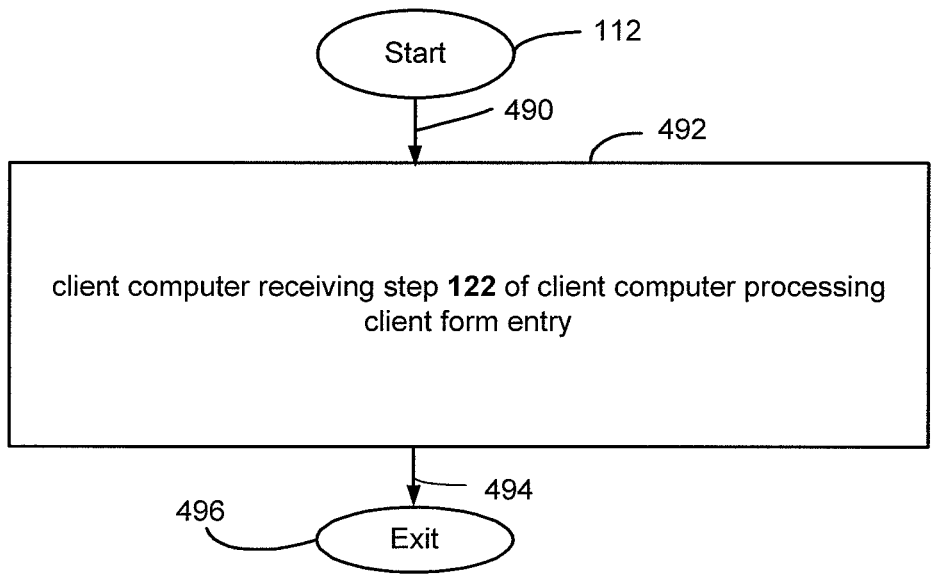
FIG. 12A depicts a detail flowchart of operation 112 of FIG. 2A further performing the client computer receiving the client form entry.

FIG. 12A depicts a detail flowchart of operation 112 of FIG. 2A further performing the client computer receiving the client form entry.

Arrow 490 directs the flow of execution from starting operation 112 to operation 492. Operation 492 performs the client computer receiving the step 122 of the client computer processing the client form entry. Arrow 494 directs execution from operation 492 to operation 496. Operation 496 terminates the operations of this flowchart.

The server may send the form to the client computer. The client computer may be operating a browser receiving the sent form as shown in FIG. 5. The form may include some JavaScript data structures. The JavaScript structures may be automatically generated from the set of rules defined for the form.

When the user attempts to submit the form, some JavaScript code may first iterate through each rule that was included in the automatically generated data structures.

Each rule is checked against the appropriate entry field. If there is a violation of the rule, the JavaScript code immediately displays a message without involving the server. The generated data structure includes message text for each rule that can be displayed if the user violates a rule.

Figure 12B:
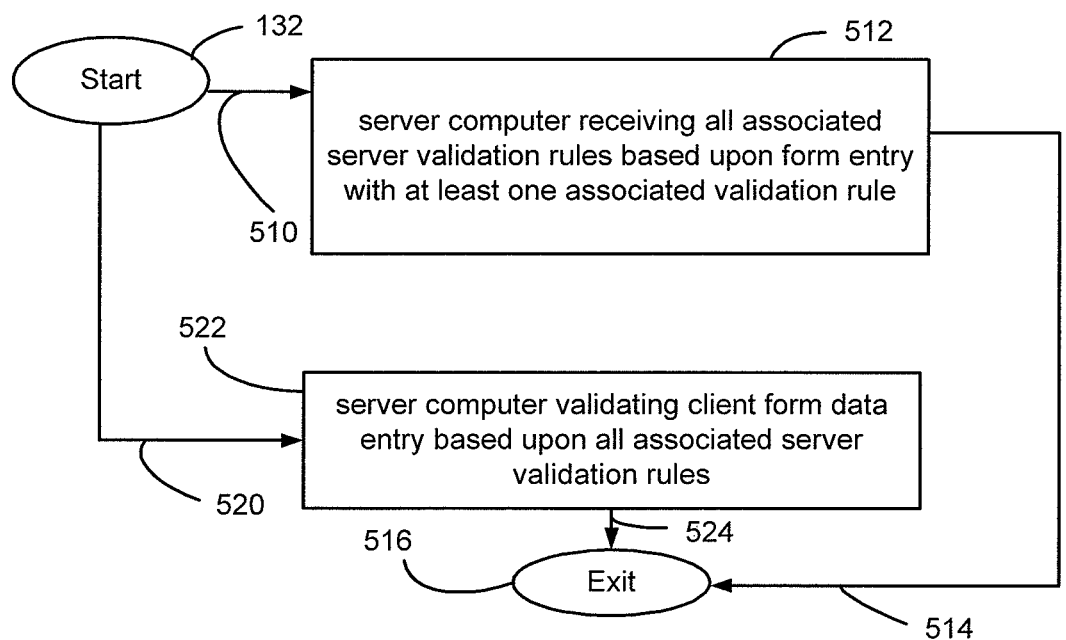
FIG. 12B depicts a detail flowchart of operation 132 of FIG. 2A further performing the server computer validating the client form data entry.

FIG. 12B depicts a detail flowchart of operation 132 of FIG. 2A further performing the server computer validating the client form data entry.

Arrow 510 directs the flow of execution from starting operation 132 to operation 512. Operation 512 performs the server computer receiving all the associated server validation rules based upon the form entry with at least one associated validation rule. Arrow 514 directs execution from operation 512 to operation 516. Operation 516 terminates the operations of this flowchart.

Arrow 520 directs the flow of execution from starting operation 132 to operation 522. Operation 522 performs the server computer validating the client form data entry based upon all the associated server validation rules. Arrow 524 directs execution from operation 522 to operation 516. Operation 516 terminates the operations of this flowchart.

When the server receives a posted form, it iterates through each of the rules defined for that set. If there is a violation of the rule, the server responds to the client with an error message.

Certain embodiments of the invention include a method of using a form containing at least one form entry with at least one associated validation rule performing data validation by both a server computer and a client computer.

Figure 13:
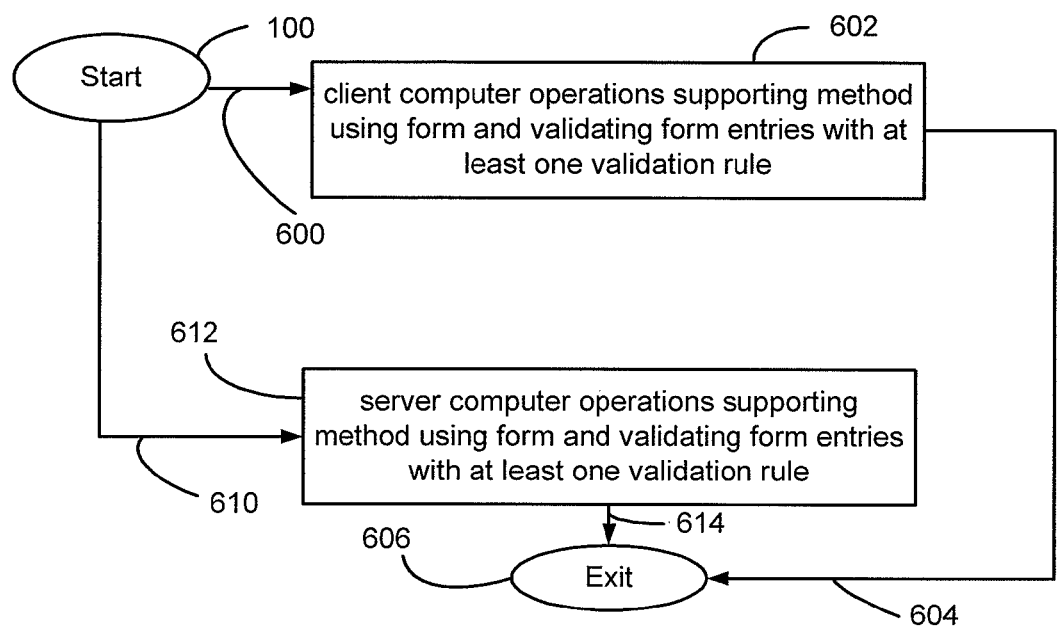
FIG. 13 depicts a detail flowchart of operation 100 of FIG. 1 further performing the method of using the form and validating form entries by both server computer 4 and client computer 50.

FIG. 13 depicts a detail flowchart of operation 100 of FIG. 1 further performing the method of using the form and validating form entries by both server computer 4 and client computer 50.

Arrow 600 directs the flow of execution from starting operation 100 to operation 602. Operation 602 performs client computer operations supporting the method using the form and validating the form entries with at least one validation rule. Arrow 604 directs execution from operation 602 to operation 606. Operation 606 terminates the operations of this flowchart.

Arrow 610 directs the flow of execution from starting operation 100 to operation 612. Operation 612 performs server computer operations supporting the method using the form and validating the form entries with at least one validation rule. Arrow 614 directs execution from operation 612 to operation 606. Operation 606 terminates the operations of this flowchart.

Figure 14A:
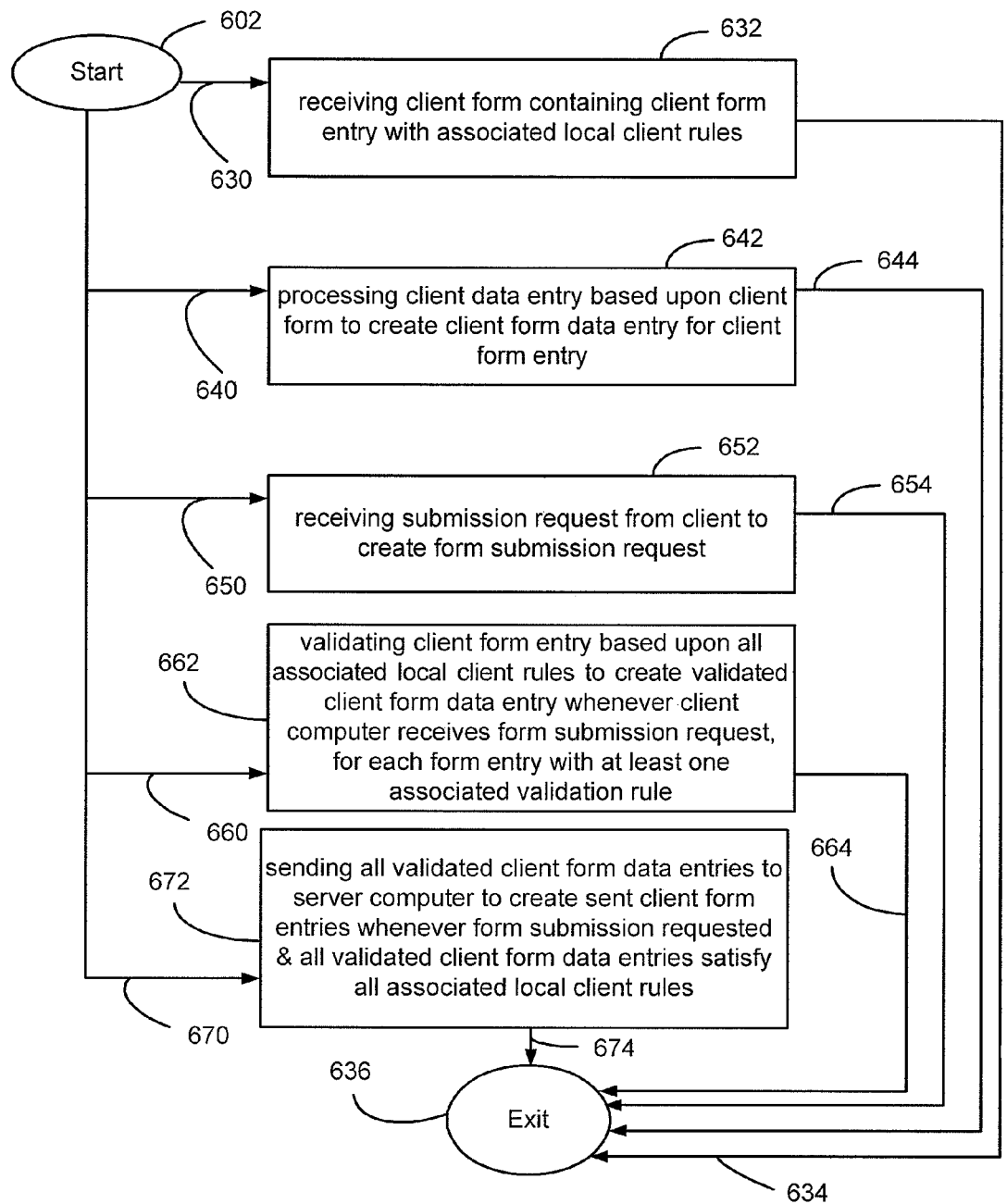
FIG. 14A depicts a detail flowchart of operation 602 of FIG. 13 further performing client computer operations supporting the method of using the form by both server computer 4 and client computer 50.

FIG. 14A depicts a detail flowchart of operation 602 of FIG. 13 further performing client computer operations supporting the method using the form and validating the form entries with at least one validation rule.

Arrow 630 directs the flow of execution from starting operation 602 to operation 632. Operation 632 performs receiving a client form containing at least one client form entry with at least one associated local client rule based upon the form containing the at least one form entry with at least one associated validation rule. Arrow 634 directs execution from operation 632 to operation 636. Operation 636 terminates the operations of this flowchart.

Arrow 640 directs the flow of execution from starting operation 602 to operation 642. Operation 642 performs processing client data entry based upon the client form to create a client form data entry for the at least one client form entry. Arrow 644 directs execution from operation 642 to operation 636. Operation 636 terminates the operations of this flowchart.

Arrow 650 directs the flow of execution from starting operation 602 to operation 652. Operation 652 performs receiving a submission request from the client to create a form submission request. Arrow 654 directs execution from operation 652 to operation 636. Operation 636 terminates the operations of this flowchart.

Arrow 660 directs the flow of execution from starting operation 602 to operation 662. Operation 662 performs validating the client form entry based upon all the associated local client rules to create a validated client form data entry whenever the client computer receives the form submission request, for each form entry with at least one associated validation rule contained in the form. Arrow 664 directs execution from operation 662 to operation 636. Operation 636 terminates the operations of this flowchart.

Arrow 670 directs the flow of execution from starting operation 602 to operation 672. Operation 672 performs sending all of the validated client form data entries to the server computer to create the sent client form data entry for each form entry with at least one associated validation rule, whenever the client requests form submission and whenever all client form data entries satisfy all of the associated local client rules. Arrow 674 directs execution from operation 672 to operation 636. Operation 636 terminates the operations of this flowchart.

Figure 14B:
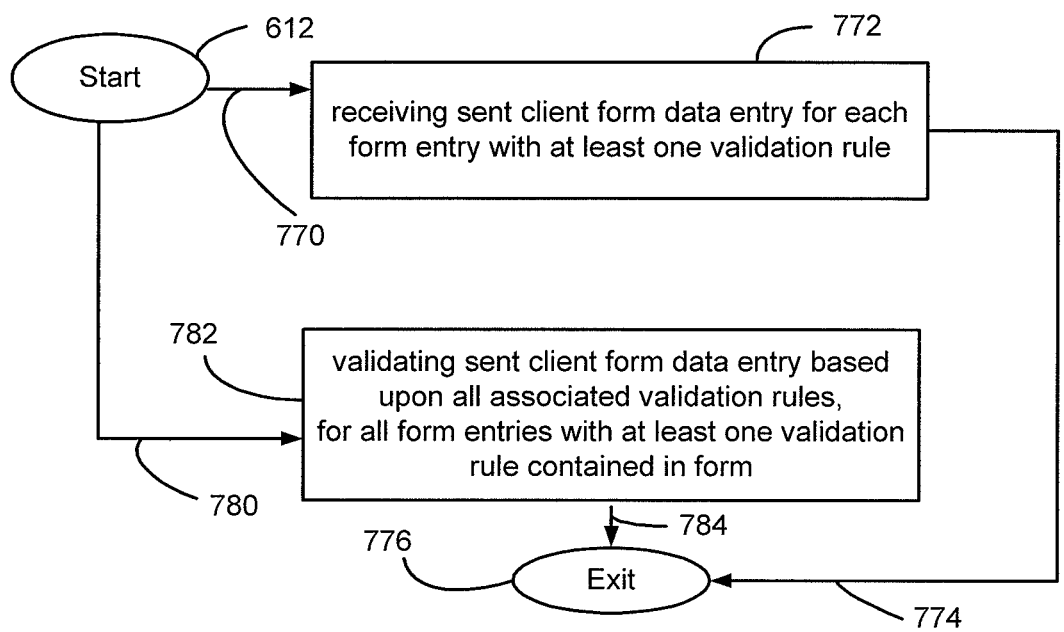
FIG. 14B depicts a detail flowchart of operation 612 of FIG. 13 further performing server computer operations supporting the method of using the form by both server computer 4 and client computer 50.

FIG. 14B depicts a detail flowchart of operation 612 of FIG. 13 further performing server computer operations supporting the method using the form and validating the form entries with at least one validation rule.

Arrow 770 directs the flow of execution from starting operation 612 to operation 772. Operation 772 performs receiving the sent client form data entry for each form entry with at least one validation rule. Arrow 774 directs execution from operation 772 to operation 776. Operation 776 terminates the operations of this flowchart.

Arrow 780 directs the flow of execution from starting operation 612 to operation 782. Operation 782 performs validating the sent client form data entries based upon all of the associated validation rules, for all form entries with at least one associated validation rule contained in the form. Arrow 784 directs execution from operation 782 to operation 776. Operation 776 terminates the operations of this flowchart.

Figure 15A:
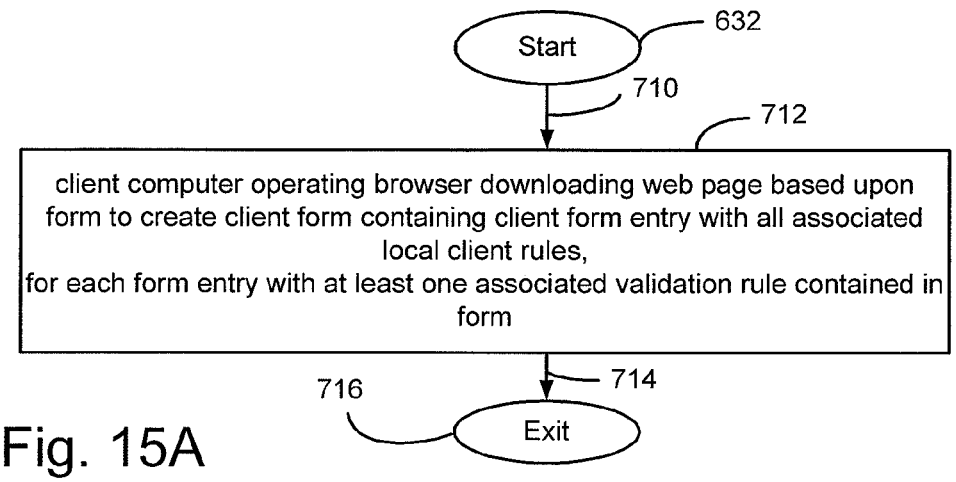
FIG. 15A depicts a detail flowchart of operation 632 of FIG. 14 further performing the client computer receiving the client form.

FIG. 15A depicts a detail flowchart of operation 632 of FIG. 14 further performing the client computer receiving the client form.

Arrow 710 directs the flow of execution from starting operation 632 to operation 712. Operation 712 performs the client computer operating a browser downloading a web page based upon the form to create the client form containing a client form entry with all the associated local client rules, for each form entry with at least one associated validation rule contained in the form. Arrow 714 directs execution from operation 712 to operation 716. Operation 716 terminates the operations of this flowchart.

Figure 15B:
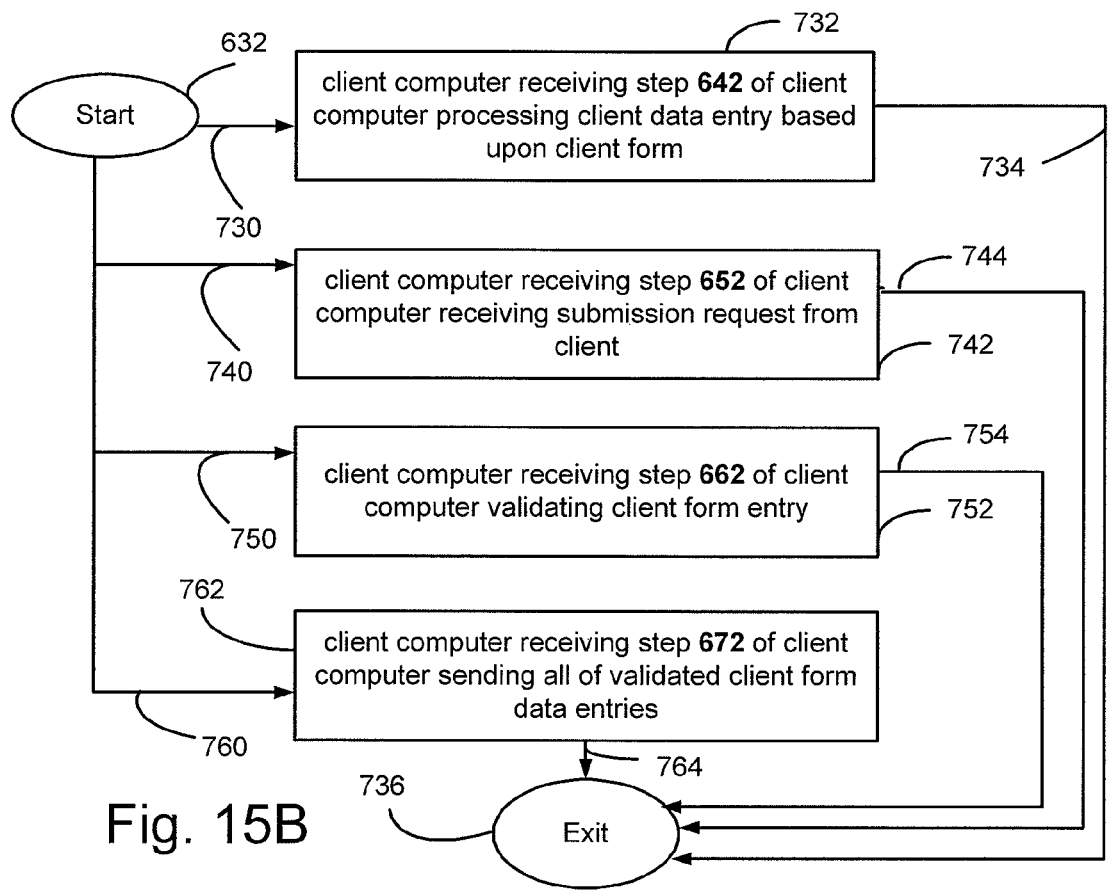
FIG. 15B depicts a detail flowchart of operation 632 of FIG. 14 further performing the client computer receiving the client form.

FIG. 15B depicts a detail flowchart of operation 632 of FIG. 14 further performing the client computer receiving the client form.

Arrow 730 directs the flow of execution from starting operation 632 to operation 732. Operation 732 performs the client computer receiving the step 642 of the client computer processing client data entry based upon the client form. Arrow 734 directs execution from operation 732 to operation 736. Operation 736 terminates the operations of this flowchart.

Arrow 740 directs the flow of execution from starting operation 632 to operation 742. Operation 742 performs the client computer receiving the step 652 of the client computer receiving the submission request from the client. Arrow 744 directs execution from operation 742 to operation 736. Operation 736 terminates the operations of this flowchart.

Arrow 750 directs the flow of execution from starting operation 632 to operation 752. Operation 752 performs the client computer receiving the step 662 of the client computer validating the client form entry. Arrow 754 directs execution from operation 752 to operation 736. Operation 736 terminates the operations of this flowchart.

Arrow 760 directs the flow of execution from starting operation 632 to operation 762. Operation 762 performs the client computer receiving the step 672 of the client computer sending all of the validated client form data entries. Arrow 764 directs execution from operation 762 to operation 736. Operation 736 terminates the operations of this flowchart.

The preceding embodiments have been provided by way of example and are not meant to constrain the scope of the following claims.

The invention claimed is:

1. A system for electronically validating client form entry data, comprising:
 a server system comprising a memory and a processor and in communication with a client system; and
 a program system stored in the memory and configured to be executed by the processor, the program system configured to perform operations comprising:
 maintaining a form collection on the server system, the form collection comprising a plurality of form content and a plurality of validation rules;
 receiving a request for form content from the client system;
 generating the form content based on the request;
 generating a set of associated validation rules for the generated form content based on the form collection maintained on the server system;
 associating the set of validation rules with the form content;
 sending the generated form content and associated validation rules to the client system;
 receiving form entry data from the client system, the form entry data including an indication that the form entry data has been verified by the client system based on the associated validation rules; and
 validating the form entry data based at least in part on the associated validation rules, the form entry data received from the client system and previously validated by the client system.

2. The system of claim 1, wherein the client system is configured to validate the form entry data using a set of client rules which are based at least in part on the associated validation rules.

3. The system of claim 2, wherein the client rules and the associated validation rules are substantially in sync.

4. The system of claim 1, wherein the form comprises at least a portion of a web page.

5. The system of claim 1, wherein the form comprises one or more elements corresponding to a form entry data field of the form.

6. The system of claim 5, wherein one or more of the associated validation rules is associated with the element.

7. The system of claim 5, wherein the one or more elements comprises a phone number of the user.

8. The system of claim 1, wherein the associated validation rules comprise JavaScript code.

9. A computer-implemented method for electronically validating client form entry data, the method comprising:
 maintaining, by one or more processors, a form collection on a server system, the form collection comprising a plurality of form content and a plurality of validation rules;
 receiving a request for form content from the client system;
 generating, by the one or more processors, the form content based on the request;

generating, by the one or more processors, a set of associated validation rules for the generated form content based on the form collection maintained on the server system;

associating the set of validation rules with the form content;

sending the generated form content and associated validation rules to the client system;

receiving form entry data from the client system, the form entry data including an indication that the form entry data has been verified by the client system based on the associated validation rules; and validating, by the one or more processors, the form entry data based at least in part on the associated validation rules, the form entry data received from the client system and previously validated by the client system.

10. The computer-implemented method of claim 9, wherein the client system is configured to validate the form entry data using a set of client rules which are based at least in part on the associated validation rules.

11. The computer-implemented method of claim 10, wherein the client rules and the associated validation rules are substantially in sync.

12. The computer-implemented method of claim 9, wherein the form comprises at least a portion of a web page.

13. A computer-implemented memory having a computer program stored thereon for causing the server to process computer-program code by performing the method of claim 9 when such program is executed on the server.

14. A system for electronically validating client form entry data, comprising:

a client system, comprising memory and a processor, in communication with a server system that maintains a form collection comprising available form content and available validation rules, the client system configured to perform operations comprising:

requesting form content from the server system;

receiving form content from the server system, the form content based on the request and including a set of associated validation rules, wherein the association between the form content and the set of validation rules is generated using the available form content and the available validation rules from the form collection;

receiving form entry data associated with the form content;

validating, using the processor, the form entry data using at least the set of associated validation rules;

providing form entry data to the server system, the form entry data including an indication that the form entry data has been verified based on the associated set of validation rules; and receiving an indication that the server system has verified the entry data based at least on the associated set of validation rules.

15. The system of claim 14, wherein the client system is configured to validate the form entry data using a set of client rules which are based at least in part on the associated validation rules.

16. The system of claim 15, wherein the client rules and the associated validation rules are substantially in sync.

17. The system of claim 14, wherein the form comprises at least a portion of a web page.

18. The system of claim 14, wherein the form comprises an element corresponding to a form entry data field of the form.

19. The system of claim 18, wherein one or more of the associated validation rules is associated with the element.

20. The system of claim 18, wherein the element comprises a phone number of the user.

* * * * *